(12) United States Patent
Haberman et al.

(10) Patent No.: US 8,416,691 B1
(45) Date of Patent: Apr. 9, 2013

(54) ASSOCIATING HOSTS WITH SUBSCRIBER AND SERVICE BASED REQUIREMENTS

(75) Inventors: Ron E. Haberman, San Jose, CA (US); Miroslav Vrana, Zumikon (CH); Joseph M. Regan, Pleasanton, CA (US); Wim Henderickx, Westerlo (BE); Pierre Alfons Leonard Verhelst, Wilrijk (BE)

(73) Assignee: Alcatel Lucent, Paris (FR)

( * ) Notice: Subject to any disclaimer, the term of this patent is extended or adjusted under 35 U.S.C. 154(b) by 716 days.

(21) Appl. No.: 11/414,725

(22) Filed: Apr. 27, 2006

(51) Int. Cl.
*G01R 31/08* (2006.01)
*H04L 12/28* (2006.01)

(52) U.S. Cl.
USPC .......................................... 370/235; 370/392

(58) Field of Classification Search .................... None
See application file for complete search history.

(56) References Cited

U.S. PATENT DOCUMENTS

| | | | |
|---|---|---|---|
| 6,223,222 B1 | 4/2001 | Fijolek et al. | |
| 6,577,628 B1 * | 6/2003 | Hejza | 370/392 |
| 6,876,667 B1 * | 4/2005 | Synnestvedt et al. | 370/466 |
| 7,260,639 B2 * | 8/2007 | Afergan et al. | 709/229 |
| 7,337,224 B1 * | 2/2008 | Van Horne et al. | 709/225 |
| 7,502,841 B2 * | 3/2009 | Small et al. | 709/223 |
| 2002/0065907 A1 * | 5/2002 | Cloonan et al. | 709/223 |
| 2003/0182666 A1 | 9/2003 | You | |
| 2004/0103310 A1 * | 5/2004 | Sobel et al. | 713/201 |
| 2005/0281205 A1 * | 12/2005 | Chandwadkar et al. | 370/249 |
| 2006/0050862 A1 * | 3/2006 | Shen et al. | 379/219 |
| 2006/0098588 A1 * | 5/2006 | Zhang et al. | 370/255 |
| 2006/0248229 A1 * | 11/2006 | Saunderson et al. | 709/245 |
| 2006/0274766 A1 * | 12/2006 | Kwon | 370/401 |
| 2007/0076607 A1 * | 4/2007 | Voit et al. | 370/230 |
| 2008/0091844 A1 * | 4/2008 | Park | 709/245 |
| 2009/0129369 A1 * | 5/2009 | Turk | 370/352 |

* cited by examiner

*Primary Examiner* — Eunsook Choi
(74) *Attorney, Agent, or Firm* — Van Pelt, Yi & James, LLP

(57) ABSTRACT

Associating hosts with subscriber and service based requirements is disclosed. An identifier is extracted from a DHCP or other network address lease communication associated with a subscriber host. The identifier is used to associate the subscriber host with a requirement that is subscriber based, service based, or both subscriber and service based. The subscriber host is included in a set of one or more subscriber hosts associated with the subscriber, the service, or both, as applicable to the requirement, and the requirement is required to be enforced collectively to the one or more subscriber hosts comprising the set.

21 Claims, 10 Drawing Sheets

US 8,416,691 B1

ASSOCIATING HOSTS WITH SUBSCRIBER AND SERVICE BASED REQUIREMENTS

BACKGROUND OF THE INVENTION

Network service providers (e.g., Internet service providers or "ISP") use multi-service edge routing to provide to their subscribers access to a range of network services, such as voice over IP (VoIP), high-speed Internet (HSI), video on demand, etc. Edge routing typically is performed at the edge of the provider's core network. An access network aggregates subscriber lines and carries network traffic to and from one or more multi-service edge routers at the provider network edge. In the case of subscribers who use digital subscriber line (DSL) connections to access network services, for example, subscriber lines typically are terminated at a digital subscriber line access multiplexer (DSLAM) at the telephone company central office (CO), which multiplexes traffic via a high speed connection to the provider's network via a provider edge router such as a multi-service edge router or other access server.

Service providers may undertake certain quality of service (QoS) or other commitments, e.g., through a service level agreement (SLA), and may be required or may agree to enforce subscriber specified or other policies, such as access control list (ACL) based or other security policies or requirements. Some of these commitments and requirements apply to a subscriber or a subscriber's access to a particular service. However, a subscriber may use more than one host to access the network and/or a particular service. Subscribers vary in terms of the number and type of services to which they subscribe, the number and type of hosts they use to access network services, the number and type of service each host is used to access, whether a residential gateway (RG) or other gateway is present on the subscriber's site (e.g., in their home), and if so whether the gateway is configured as a bridge (each host visible to the access network) or a router (gateway visible to the access network). Therefore, there is a need for an effective way to associate subscriber hosts that connect to a provider network with subscriber and/or service based policies.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Associating a subscriber host with subscriber and/or service based requirements is disclosed. In some embodiments, dynamic host configuration protocol (DHCP) IP address "lease" communications are monitored and parsed to extract an identifier usable to associate a subscriber host with which the lease communication is associated with a subscriber and/or service based requirement. In some embodiments, the identifier comprises a string extracted from "option 82" injected into the DHCP lease communications by an access network node, such as a DSLAM in the case of DSL access. The string is mapped to a subscriber and/or service based SLA template or other policy applicable to the host. Multiple hosts associated with the same subscriber and/or used by a single subscriber to access the same service are associated together with a single instance, as applicable, of subscriber and/or service based requirements, as applicable.

Figure 1A:
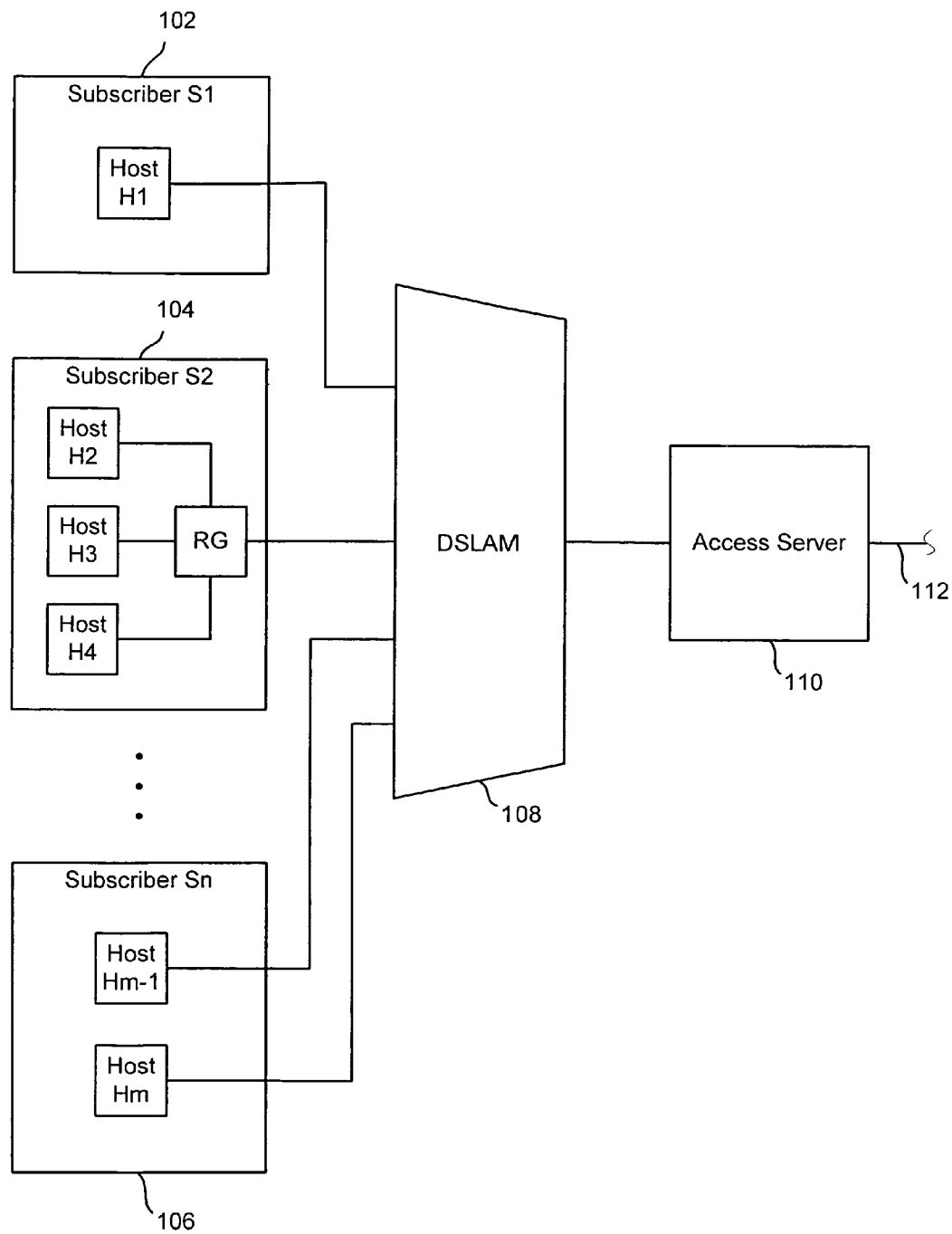
FIG. 1A is a block diagram illustrating an embodiment of a system for associating a subscriber host with subscriber and/or service based requirements.

FIG. 1A is a block diagram illustrating an embodiment of a system for associating a subscriber host with subscriber and/or service based requirements. In the example shown, a plurality of subscribers, represented in FIG. 1A by subscribers S1 (102), S2 (104), and Sn (106) access network services via respective DSL connections to an access node, in this example DSLAM 108, e.g., located at a local telephone company central office. The DSLAM 108 provides connectivity via an access server 110 to network services provided via a core provider network to which the access server 110 is connected via a connection 112. In various embodiments, access server 110 comprises one or more physical systems and connection 112 represents one or more interfaces and/or connections to the core network. Examples of access server 110 include a multi-service provider edge router, such as the Alcatel™ 7750 service router (SR), one or more aggregation nodes such as the Alcatel™ 7740 Ethernet service switch (ESS), and/or solutions including both the Alcatel™ 7750 SR and the Alcatel™ 7740 ESS.

In the example shown in FIG. 1A, each subscriber uses one or more hosts to access services via DSLAM 108 and access server 110. Subscriber S1 (102) uses a single host H1, subscriber S2 (104) uses three hosts H2, H3, and H4 connected to DSLAM 108 via a residential gateway (RG), and subscriber Sn (106) uses hosts Hm-1 and Hm. The hosts H1 through Hm, represented in FIG. 1A by hosts H1, H2, H3, H4, Hm-1, and Hm, may be configured in any number of ways. For example, each host associated with a subscriber may be configured to access a particular service (e.g., HSI) or a subscriber may use the same host to access two or more types of service. For example, a host that uses high speed Internet service (HSI) for general web access (e.g., browsing) may also be used to access video on demand service or VoIP service. Techniques are known to identify a host that is connecting via an access infrastructure such as the one shown in FIG. 1A, however, to identify and enforce subscriber based and/or service based policies, service level commitments, and/or other requirements, it is necessary to associate hosts with a subscriber and/or service context, e.g., as described further below.

Figure 1B:
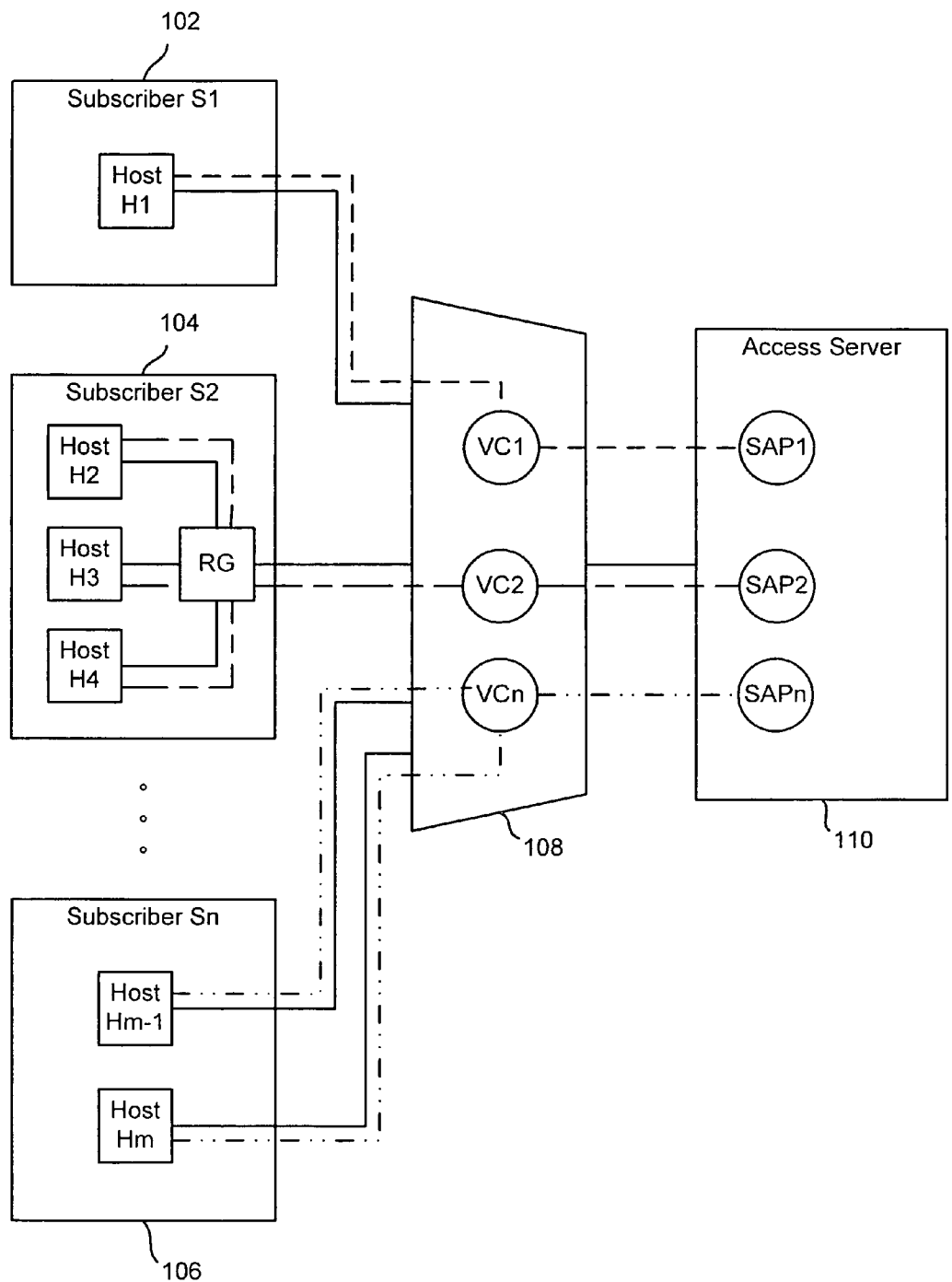
FIG. 1B is a block diagram illustrating an embodiment of a system for associating a subscriber host with subscriber and/or service based requirements.

FIG. 1B is a block diagram illustrating an embodiment of a system for associating a subscriber host with subscriber and/or service based requirements. In the example shown in FIG. 1B, a separate virtual circuit (VC) is configured for each subscriber to enable the traffic associated with that subscriber to be identified. In the example shown, network traffic to/from subscriber S1 (102), represented in FIG. 1B by the dashed line beginning at host H1, is associated at the DSLAM 108 with a first virtual circuit VC1. Traffic associated with VC1 is tagged with a virtual circuit tag that enables the traffic to be handled correctly. For example, DSLAM 108 uses the virtual circuit tag for traffic associated with VC1 to route subscriber bound traffic to the correct subscriber, in this example subscriber S1 (102), and to direct outbound traffic from subscriber S1 to the correct interface/context at access server 110. In the example shown, first virtual circuit VC1 is bound to a first service access point SAP1. The term "service access point" is used herein to refer to virtual port or other virtual interface configured to provide access to one or more network service, e.g., by processing traffic associated with a particular subscriber and/or multiple subscribers using a particular service. In this example, a separate service access point (SAP) has been configured for each subscriber, and the virtual circuit for each subscriber is bound to the corresponding SAP. Subscriber S2 (104) uses hosts H2, H3, and H4 to access network services via an associated residential gateway and a second virtual circuit VC2 bound to SAP2. Traffic associated with second virtual circuit VC2 is indicated by the long-short-long patterned line beginning at hosts H2, H3, and H4. Finally, in this example subscriber Sn (106) uses hosts Hm-1 and Hm to access network services via an n-th virtual circuit VCn bound to an n-th service access point SAPn. Traffic associated with n-th virtual circuit VCn is indicated by the dash-dot-dot-dash patterned line beginning at hosts Hm-1 and Hm. In the example shown in FIG. 1B, it is relatively easy to associate subscriber traffic and/or hosts with a subscriber context, e.g., for purposes of enforcing subscriber based policies, commitments, and/or other requirements; but it may still be necessary to associate hosts with a service context.

Figure 1C:
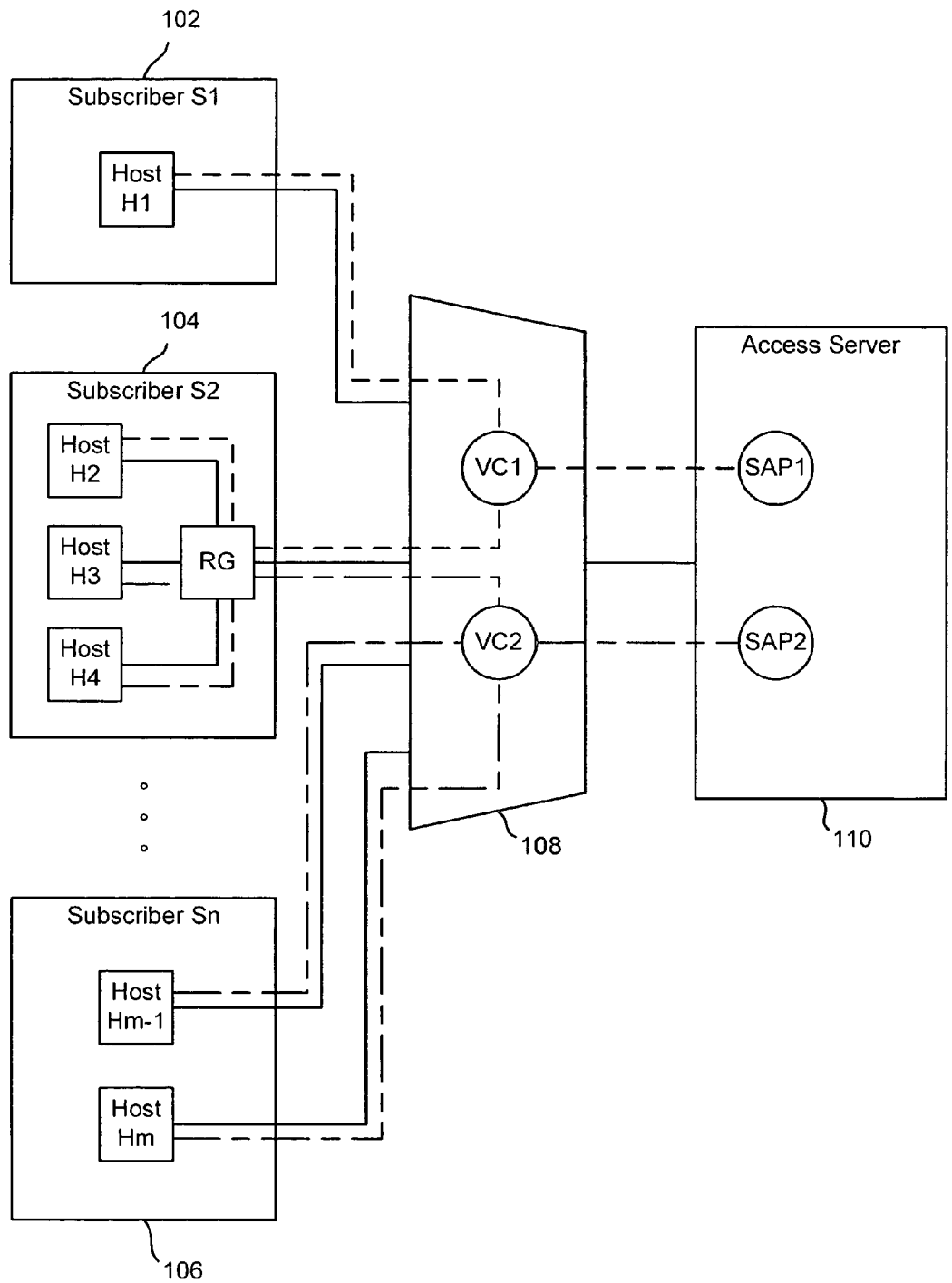
FIG. 1C is a block diagram illustrating an embodiment of a system for associating a subscriber host with subscriber and/or service based requirements.

FIG. 1C is a block diagram illustrating an embodiment of a system for associating a subscriber host with subscriber and/or service based requirements. In this example, a virtual circuit and associated service access point is configured for each service, instead of by subscriber as shown in FIG. 1B. Each subscriber that accesses a service uses the same virtual circuit and associated service access point. In the example shown, there are two services (e.g., high speed internet and video on demand), including a first service for which a first virtual circuit VC1 and a first service access point SAP1 are configured, and a second service for which a second virtual circuit VC2 and a second service access point SAP2 are configured. Traffic associated with the first service is indicated in FIG. 1C by the dashed lines beginning at hosts H1 and H2, which in this example are used by subscribers S1 (102) and S2 (104), respectively, to access the first service. Traffic associated with the second service is indicated in FIG. 1C by the long-short-long patterned lines beginning at hosts H3, H4, Hm-1, and Hm, which in this example are used by subscribers S2 (104) and Sn (106) to access the second service.

In the example shown in FIG. 1C, it is likely that traffic to/from multiple subscribers will share the same virtual circuit and service access point. Hosts associated with two different subscribers access the first service via SAP1, for example, in the example shown in FIG. 1C. Also, for subscribers that use different hosts to access different services, e.g., subscriber S2 in the example shown in FIG. 1C, traffic to/from hosts associated with the same subscriber will be spread across multiple service access points, making it relatively more difficult than in the configuration shown in FIG. 1B to associate such hosts with their common subscriber context, e.g., for purposes of enforcing subscriber based requirements. In addition, a subscriber may use the same host to access two or more services (not shown in FIG. 1C), such that traffic from a single host may be spread across service access points, further complicating the task of associating traffic with the correct subscriber and/or service context for purpose of enforcing subscriber and/or service based requirements.

FIGS. 1B and 1C show two examples of how an access server may be configured by a provider to provide access to multiple services via a single provider network, e.g., a single 1P/MPLS provider core network. In the examples shown, service access points configured on a per subscriber (FIG. 1B) or per service (FIG. 1C) basis are shown. However, other configurations may be used, and it is desirable to provide a way to associate traffic with a subscriber and/or service context, as applicable, to enable subscriber and/or service based requirements to be enforced, regardless of how a particular service provider chooses to configure service access points or similar structures to provide access to network services.

Figure 2:
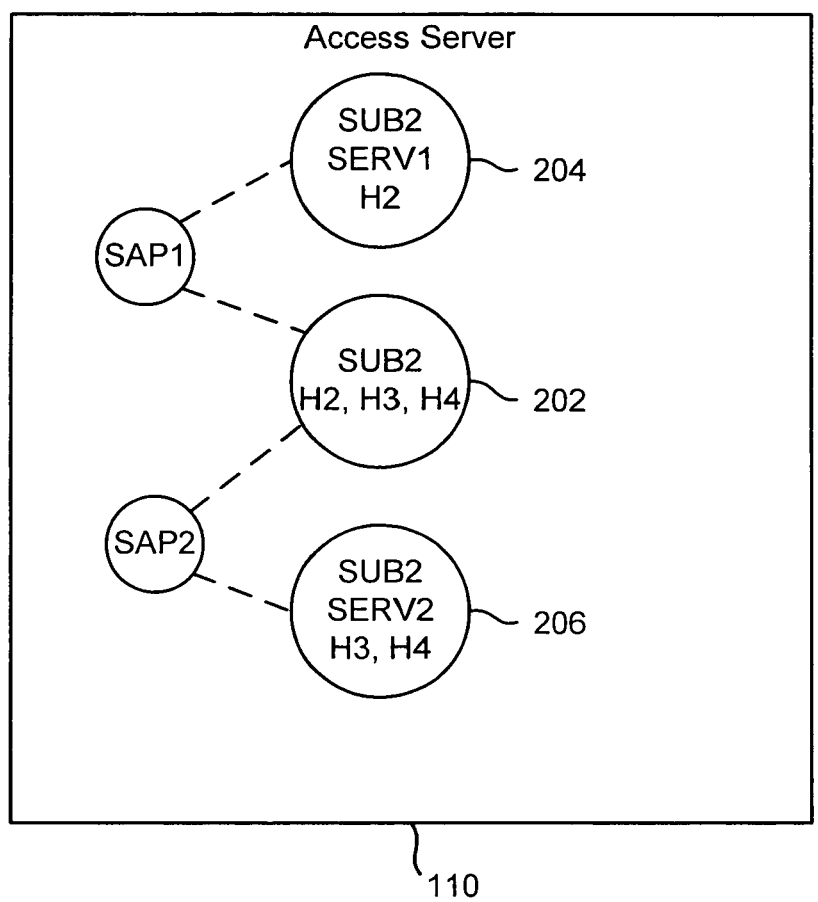
FIG. 2 is a block diagram illustrating an embodiment of an access server.

FIG. 2 is a block diagram illustrating an embodiment of an access server. In the example shown, a first service access point SAP1 is configured to provide access to a first service and a second service access point SAP2 is configured to provide access to a second service. In this example, the first and second service access points SAP1 and SAP2 correspond to the first and second service access points of FIG. 1C. Hosts H2, H3, and H4 are shown in this example as being associated with a subscriber context 202 associated with subscriber S2 (106) of FIG. 1C. In this example, the residential gateway (RG) of FIG. 1C is assumed to be configured as a bridge, such that the individual hosts H2, H3, and H4 are visible individually at the access server 110. In addition, host H2 is shown as being associated with a first service context (204) for subscriber S2 and hosts H3 and H4 are shown as being associated with a second service context (206) for subscriber S2. Note that traffic and/or hosts across both service access points SAP1 and SAP2 must be associated together into a single subscriber context 202, e.g., to enable subscriber based requirements such as security policies, aggregate (subscriber level) quality of service commitments, and other subscriber based requirements to be enforced and/or met. In some embodiments, each of subscriber context 202 and service contexts 204 and 206 includes an instance of an associated service level agreement (SLA) template configured to enforce subscriber and/or service based requirements, as applicable. Examples of subscriber based requirements include security requirements, e.g., whether SNMP traffic may be sent to a subscriber's host or whether port 80 (HTTP) requests downstream will be allowed (which may differ for residential and business subscribers, for example), and subscriber (aggregate) or service based quality of service (e.g., speed/bandwidth) commitments. In some embodiments, one or more of subscriber context 202 and service contexts 204 and 206 include one or more filters determined and/or configured to filter traffic associated with one or more subscriber hosts, e.g., by associating one or more IP addresses with the filter instance based on a determination that the host/IP address is associated with the subscriber and/or the security policy the filter is configured to enforce. In some embodiments, one or more of subscriber context 202 and service contexts 204 and 206 include one or more queues and associated scheduler policy instance(s) configured to enforce a QoS or other SLA requirement. In some embodiments, subscriber context 202 includes a single scheduler policy instance with which traffic for all hosts associated with the subscriber, in this example hosts H2, H3, and H4, is associated, including if applicable across service access points.

For flexibility and ease of use, many provider networks use the dynamic host configuration protocol (DHCP) to configure hosts to access the provider's network, e.g., by assigning to each host dynamically, at the time a host seeks to connect to the network, an IP address to be used to access the network. DHCP, for example, is client/host focused, in the sense that if DHCP or another protocol is used to configure hosts dynamically to access the provider network, host identifying information (e.g., IP address can be determined and used to determine dynamically which host particular traffic is associated with. However, the DHCP protocol does not provide directly a ready way to associated hosts with a subscriber and/or service context.

Figure 3:
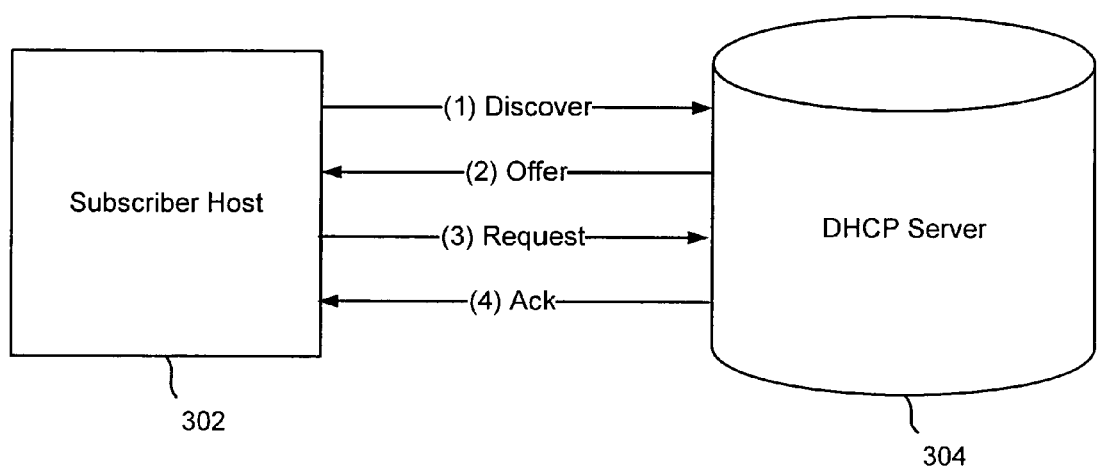
FIG. 3 is a block diagram illustrating communications associated with configuring a host using the DHCP protocol.

Extracting from DHCP lease communications data usable to associate a host with a subscriber and/or service context is disclosed. FIG. 3 is a block diagram illustrating communications associated with configuring a host using the DHCP protocol. A subscriber host 302 desiring to access services from an IP-based network, such as an IP/MPLS based provider network, first obtains an IP address by sending a DHCP discover message to one or more DHCP servers 304. The DHCP server 304 sends a DHCP offer to the subscriber host 302, offering use of an IP address specified in the DHCP offer communication for a specified lease period. The subscriber host 302 chooses an offer, if multiple offers have been received, e.g., from multiple DHCP servers, and communicates a DHCP request to the DHCP server that made the offer desired to be accepted, in this example DHCP server 304. The DHCP server 304 sends a DHCP acknowledgement to the subscriber host 302, notifying the subscriber host 302 that it may begin using the IP address indicated in the DHCP request and acknowledgement and may continue to do so for the duration of the specified lease period.

In a typical provider network environment, an access server such as access server 110 of FIGS. 1A-2, is located in the path of DHCP lease communications between a subscriber host and a DHCP server. In some embodiments, an access server is configured to "snoop" DHCP lease communications as they pass through the access server, or to act as a relay for such communications, thereby enabling the access server to extract from DHCP lease communications information usable to associate a host with a subscriber and/or service context.

Figure 4:
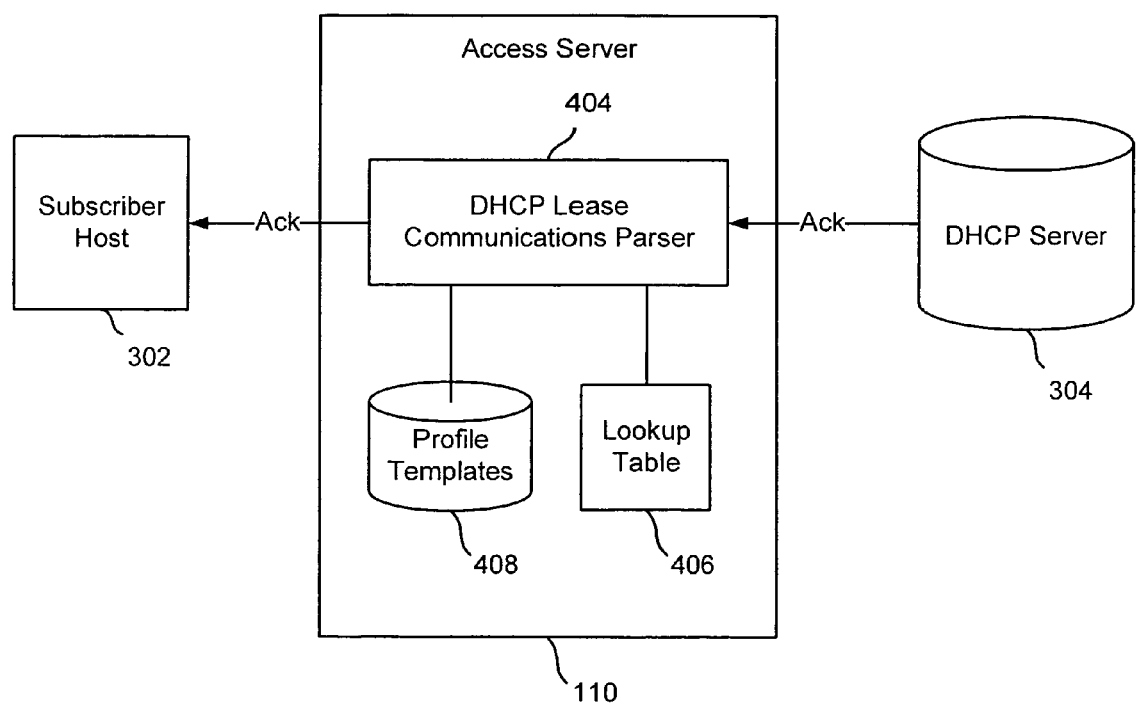
FIG. 4 is a block diagram illustrating an embodiment of an access server configured to extract data from DHCP lease communications between a subscriber host and a DHCP server and use the extracted data to associate the subscriber host with subscriber and/or service based requirements.

FIG. 4 is a block diagram illustrating an embodiment of an access server configured to extract data from DHCP lease communications between a subscriber host and a DHCP server and use the extracted data to associate the subscriber host with subscriber and/or service based requirements. In the example shown, the access server 110 is configured to monitor DHCP lease communications between subscriber host 302 and DHCP server 304 of FIG. 3. In the example shown in FIG. 4, the DHCP acknowledgement sent by DHCP server 304 to subscriber host 302 is received and parsed by a DHCP lease communication parser 404 to extract from the DHCP acknowledgement data usable to associate the subscriber host with subscriber and/or service based requirements. In some embodiments, parser 404 extracts from the DHCP acknowledgement an IP address assigned to the subscriber host 302 and one or more fields of data, which data is used by parser 404 to generate a string that is then used to identify one or more SLA or other templates indicating subscriber and/or service based requirements to be enforced with respect to the subscriber host 302. In some embodiments, a lookup table 406 is used to map the extracted string to an associated subscriber and/or service based SLA template. The SLA template is stored in a profile template database 408, from which the template is retrieve and used to create and configured data structures associated with the subscriber and/or service based requirement (e.g., one or more ingress queues to be used to process inbound traffic from the subscriber host), and to create and/or associate the subscriber host with an instance of a profile configured to enforce the associated subscriber and/or service based requirements (e.g., a scheduler process and/or policy associated with a subscriber with which the subscriber host is associated).

In some embodiments, the parser 404 comprises an embedded Python script processing engine configured, e.g., via a user-defined and/or indicated script, to extract from the DHCP lease communications (e.g., the DHCP acknowledgement) data usable to associate the subscriber host with a subscriber and/or service context. In some embodiments, the script comprises one or more regular expressions configured to identify and extract from the DHCP lease communication the data usable to associate the subscriber host with a subscriber and/or service context. In some embodiments, the data extracted by parser 404 includes DHCP "option 82" data added by a DSLAM or other access node through which the subscriber host sends/receives DHCP lease communications. Option 82 is defined by the DHCP standard specification and typically includes a circuit identifier, e.g., indicating the DSLAM port on which the DHCP request was received and a virtual circuit identifier with which the DHCP request is associated. In some cases, the DHCP server is configured to use option 82 information, e.g., to identify an IP address pool from which to assign an IP address to the requesting host. In some embodiments, DSLAM physical port information is extracted from the option 82 data and mapped (either directly or by generating a string based thereon), e.g., using a lookup table such as table 406 of FIG. 4, to a subscriber identifier that in turn is used as a key to find, in a policy template database such as database 408 of FIG. 4, one or more subscriber and/or service based requirements to be enforced with respect to the subscriber host. In some embodiments, the approach described above and shown in FIG. 4 makes it unnecessary to provision the access server on a per subscriber basis to enforce subscriber and/or service based requirements. Instead, a set of predefined templates are stored and for each subscriber one or more entries are included in table 406 to map a subscriber identifier and/or one or more service identifiers extracted from DHCP lease communication to one or more corresponding profiles (e.g., SLA templates) to be applied with respect to the subscriber hosts associated with the subscriber and/or the host(s) used by the subscriber to access a particular service.

Figure 5:
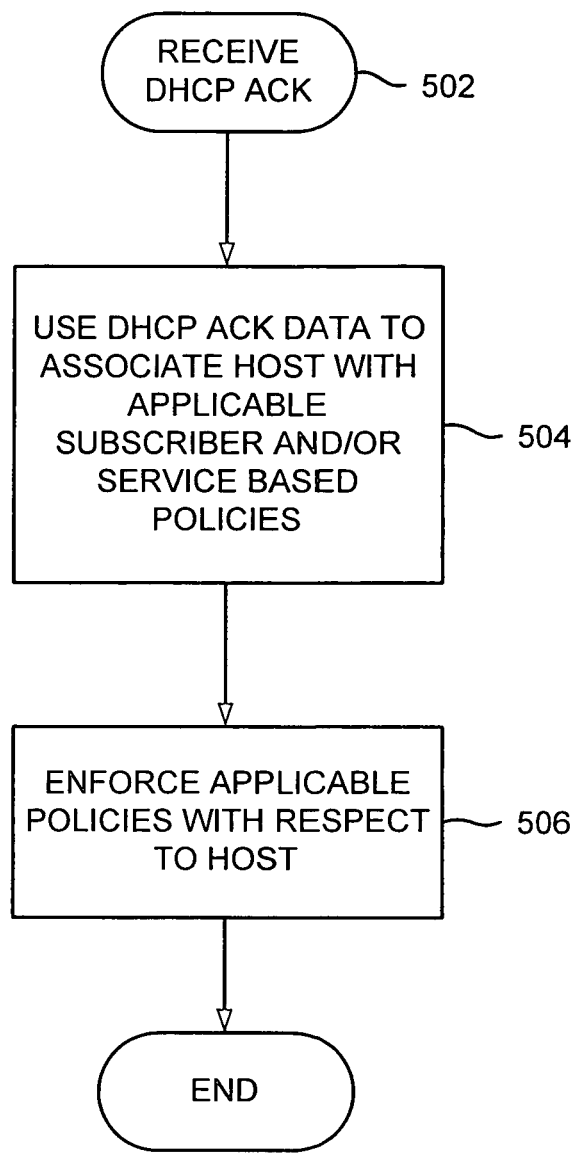
FIG. 5 is a flow chart illustrating an embodiment of a process for associating a subscriber host with subscriber and/or service based requirements.

FIG. 5 is a flow chart illustrating an embodiment of a process for associating a subscriber host with subscriber and/or service based requirements. In some embodiments, the process of FIG. 5 is implemented on a multi-service edge router, such as the access router 110 of FIGS. 1A-2 and 4. In the example shown, a DHCP acknowledgement is received (502). In some embodiments, 502 includes monitoring DHCP lease communications between a subscriber host and a DHCP server. Data usable to associate a subscriber host with which the DHCP acknowledgement is associated with a subscriber and/or service based requirement is extracted from the DHCP acknowledgement (504). In some embodiments, 504 includes parsing the DHCP acknowledgement and generating, based at least in part on option 82 and/or other data comprising the DHCP acknowledgement, a string usable to identify a subscriber and/or service profile usable to associate the subscriber host with a subscriber and/or service based requirement. In some embodiments, 504 includes using a string extracted from the DHCP acknowledgement to perform a lookup in a table such as table 406, and using a subscriber (or other) identifier read from the table to create an instance of a subscriber and/or service based policy and associate the subscriber host with the newly created policy (e.g., by associating the IP address assigned to the subscriber host with the policy instance) and/or to associate the subscriber host with an existing policy instance, e.g., an instance created and associated previously with one or more other hosts associated with the same subscriber and/or used by a subscriber to access the same service. Applicable subscriber and/or service based policies subsequently are enforced with respect to the subscriber host (506).

Figure 6:
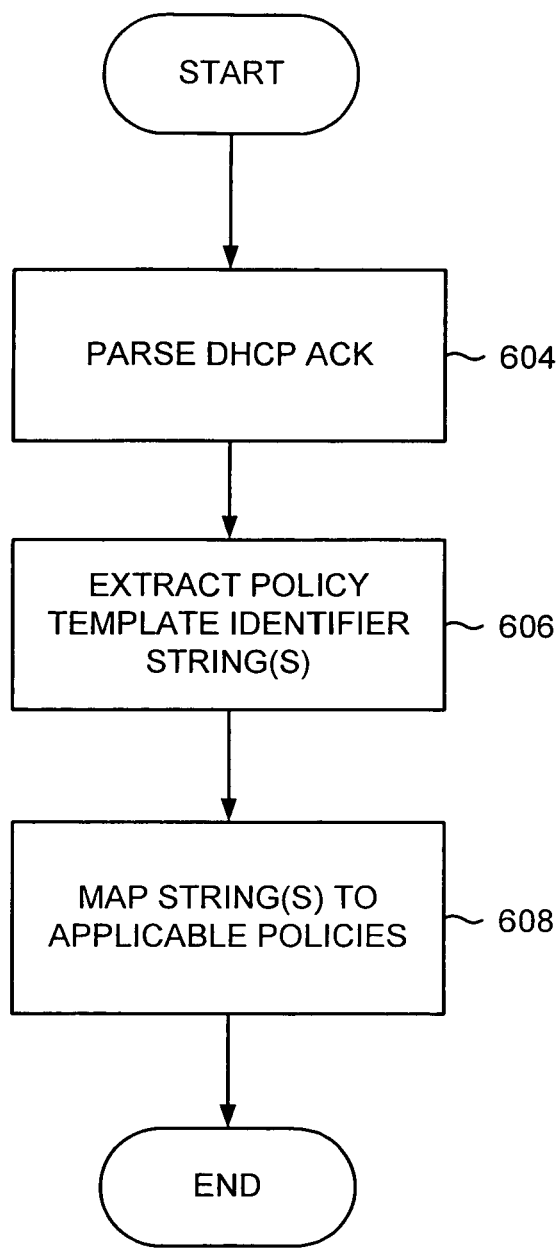
FIG. 6 is a flow chart illustrating an embodiment of a process for using DHCP lease communication data to associate a subscriber host with subscriber and/or service based requirements.

FIG. 6 is a flow chart illustrating an embodiment of a process for using DHCP lease communication data to associate a subscriber host with subscriber and/or service based requirements. In some embodiments, 504 of FIG. 5 includes the process of FIG. 6. A DHCP acknowledgement (or other DHCP lease communication) is parsed (604). In some embodiments, 604 includes parsing type-length-value fields included in the DHCP acknowledgement to extract one or more name-value pairs. One or more policy (e.g., SLA) template identifier strings are extracted from the parsed DHCP acknowledgement data (606). In some embodiments, at least one identifier extracted in 606 comprises a subscriber identifier associated uniquely with a subscriber with which the subscriber host to which the DHCP acknowledgement pertains. The identifier string is mapped to one or more subscriber and/or service based policies (e.g., profiles and/or templates) to be enforced with respect to the subscriber host to which the DHCP acknowledgement pertains. In some embodiments, 606 includes consulting a lookup table such as table 406 of FIG. 4. In some embodiments, 606 includes using the result of such a lookup to associate the subscriber host with a new and/or previously created instance of an applicable policy.

Figure 7:
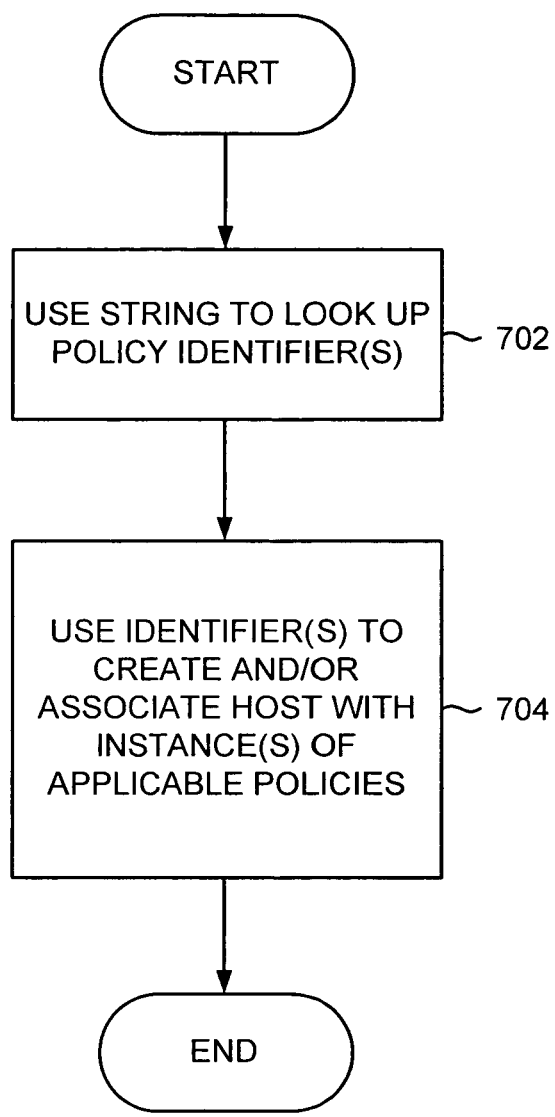
FIG. 7 is a flow chart illustrating an embodiment of a process for associating a subscriber host with subscriber and/or service based requirements.

FIG. 7 is a flow chart illustrating an embodiment of a process for associating a subscriber host with subscriber and/or service based requirements. In some embodiments, 606 of FIG. 6 includes the process of FIG. 7. A string extracted from a DHCP lease communication (e.g., DHCP acknowledgement) is used to look up one or more policy identifiers (702), e.g., from a lookup table such as table 406 of FIG. 4. The policy identifier(s) is/are used to associate the subscriber host with a new and/or previously created instance(s) of one or more applicable policies (704), e.g., by using the identifier determined at 702 to retrieve the applicable policy from a policy database such as database 408 of FIG. 4. In some embodiments, 702 includes associating the subscriber host with a subscriber profile and 704 includes retrieving the subscriber profile and/or one or more policies associated with the subscriber profile.

Figure 8:
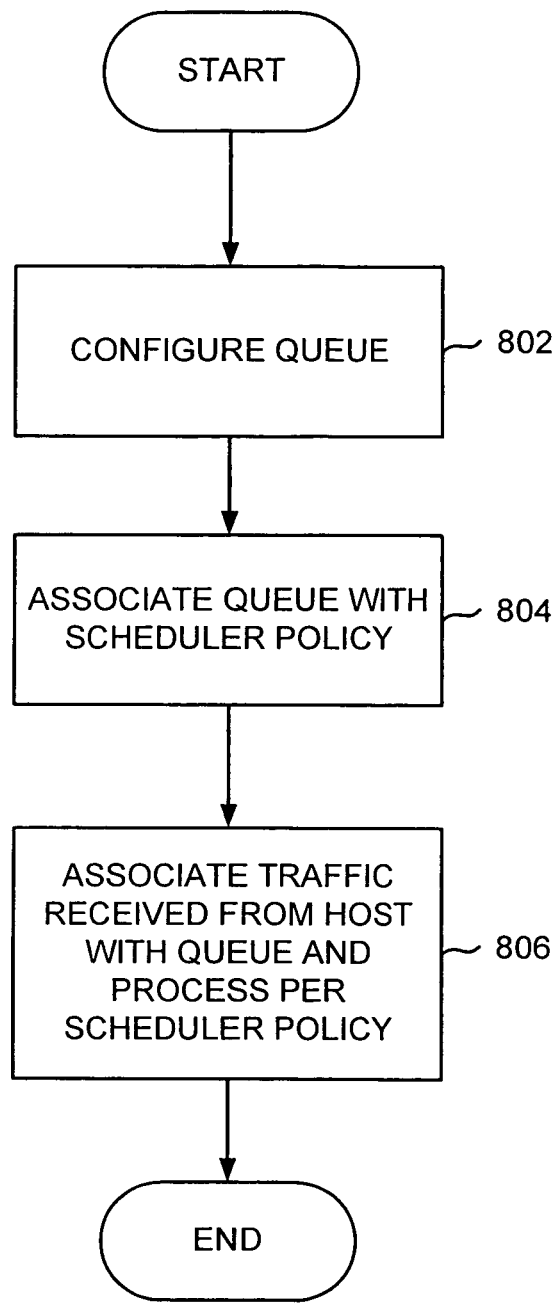
FIG. 8 is a flow chart illustrating an embodiment of a process for enforcing a subscriber and/or service based requirement.

FIG. 8 is a flow chart illustrating an embodiment of a process for enforcing a subscriber and/or service based requirement. In some embodiments, the process of FIG. 8 is used to enforce an aggregate QoS or other subscriber based requirement with respect to one or more hosts associated with a particular subscriber. In the example shown, a queue, e.g., an ingress queue, is configured to receive traffic associated with one or more hosts associated with a subscriber (802). In some embodiments, 802 includes binding an IP address assigned to one or more subscriber hosts to an ingress or other queue associated with a subscriber with which the one or more subscriber hosts are associated. A scheduler policy is associated with the queue (804). In some embodiments, the scheduler policy determines at least in part how/when packets are pulled from the ingress queue configured at 802 and processed. In some embodiments, a single instance of a scheduler policy is configured to enforce an aggregate QoS or other subscriber base SLA commitment and all hosts associated with a particular subscriber are linked to the single scheduler policy instance. In some embodiments, one or more service based requirements may also be required to be enforced, and one or more hosts used by a particular subscriber to access a particular service may be bound to a policy instance configured to enforce the service based requirement. At 806, traffic received from one or more subscriber hosts associated with the subscriber for which the queue was configured in 802 is associated with (e.g., place in) the queue configured in 802, e.g., on the basis of assigned IP address, and packets are pulled from the queue and processed in accordance with the aggregate scheduler policy associated with the queue at 804.

While the example shown in FIG. 8 involves enforcing an aggregate QoS commitment with respect to all traffic associated with a particular subscriber, across one or more hosts associated with the subscriber, the approaches described herein are used in various embodiments to enforce other subscriber and/or service based requirements across one or more subscriber hosts. Other examples of subscriber and/or service based requirements include, without limitation, using DHCP lease communication data to enforce security requirements, e.g., by adding dynamically to an ACL or other filter an M address assigned to a subscriber host, and enforcing per service QoS and/or other SLA commitments applicable to those hosts used by a particular subscriber to access a particular service.

In some embodiments, a single host may be configured to access two or more services, or a routed residential gateway may result in multiple hosts each used to access a different network service appearing to the network as a single host (i.e., the residential gateway) accessing multiple services. In some embodiments, such hosts are associated with more complicated SLA templates that enable any service based requirements, if any, applicable to a particular service to be enforced with respect to traffic associated with that service.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of associating a host with a requirement, comprising:
    extracting using a processor a first identifier from a first dynamic host configuration protocol (DHCP) or other network address lease communication associated with a first subscriber host for a first service;
    determining using a processor that first requirement will be applied to the first subscriber host for the first service based on the first identifier;
    extracting using a processor a second identifier from a second dynamic host configuration protocol (DHCP) or other network address lease communication associated with the first subscriber host for a second service;
    determining using a processor that a second requirement will be applied to the subscriber host for the second service;
    extracting using a processor a third identifier from a third dynamic host configuration protocol (DHCP) or other network address lease communication associated with a second subscriber host for the first service; and
    determining using a processor that the first requirement will be applied to the second subscriber host for the first service;
    wherein the first identifier comprises a digital subscriber line access multiplexer (DSLAM) physical port identifier and wherein determining that the first requirement will be applied to the first subscriber host includes performing a lookup to map the DSLAM physical port identifier to a corresponding subscriber identifier and using the corresponding subscriber identifier to determine that the first requirement is to be applied to the first subscriber host for the first service.

2. A method as recited in claim 1, wherein extracting the first identifier includes parsing the DHCP or other network address lease communication.

3. A method as recited in claim 2, wherein extracting the first identifier includes parsing DHCP option 82 information.

4. A method as recited in claim 1, further comprising retrieving the subscriber profile from a profile database.

5. A method as recited in claim 1, further comprising using the identifier to retrieve from a database a template configured to enforce the requirement.

6. A method as recited in claim 1, further comprising enforcing the requirement at least in part by associating with a policy instance configured to enforce the requirement a network address associated with the subscriber host in the DHCP or other network address lease communication.

7. A method as recited in claim 1, further comprising enforcing the requirement at least in part by adding to a filter, access control list (ACL), or other list associated with the requirement a network address associated with the subscriber host in the DHCP or other network address lease communication.

8. A method as recited in claim 1, wherein the requirement comprises an aggregate quality of service commitment applicable collectively to the set of one or more subscriber hosts and the method further comprises enforcing the requirement at least in part by configuring a queue to receive network traffic associated with set of one or more subscriber hosts and associating with the queue a scheduler policy instance configured to enforce the requirement.

9. A method as recited in claim 1, further comprising associating network traffic associated with the set of one or more subscriber hosts with a policy instance configured to enforce the requirement.

10. A method as recited in claim 1, further comprising configuring a Python or other script engine to extract the identifier.

11. A system configured to associate a host with a requirement, comprising:
    a communication interface configured to receive a DHCP or other network address lease communication; and
    a processor coupled to the communication interface and configured to:
        extract a first identifier from a first DHCP or other network address lease communication associated with a first subscriber host for a first service; and
        use the first identifier to determine a first requirement that will be applied to the first subscriber host for the first service;
        extract using a processor a second identifier from a second dynamic host configuration protocol (DHCP) or other network address lease communication associated with the first subscriber host for a second service;
        determine using a processor that a second requirement will be applied to the subscriber host for the second service;
        extract using a processor a third identifier from a third dynamic host configuration protocol (DHCP) or other network address lease communication associated with a second subscriber host for the first service; and
        determine using a processor that the first requirement will be applied to the second subscriber host for the first service;
        wherein the first identifier comprises a DSLAM physical port identifier and wherein the processor is configured to determine that the first requirement will be applied to the first subscriber host at least in part by performing a lookup to map the DSLAM physical port identifier to a corresponding subscriber identifier and using the corresponding subscriber identifier to determine that the first requirement is to be applied to the first subscriber host for the first service.

12. A system as recited in claim 11, wherein the system comprises a router.

13. A system as recited in claim 11, wherein the system comprises a multi-service edge router.

14. A system as recited in claim 11, further comprising a storage device configured to store data associated with the requirement.

15. A system as recited in claim 14, wherein the data associated with the requirement comprises a subscriber profile.

16. A method as recited in claim 14, wherein the data associated with the requirement comprises a template configured to enforce the requirement.

17. The system as recited in claim 11, wherein extracting the first identifier includes parsing the DHCP or other network address lease communication.

18. The system of as recited in claim 11, wherein extracting the first identifier includes parsing DHCP option 82 information.

19. A computer program product for associating a host with a requirement, the computer program product being embodied in a non-transitory computer readable storage medium and comprising computer instructions for:
  extracting first identifier from a DHCP or other network address lease communication associated with a first subscriber host for a first service; and
  using the first identifier to determine a first requirement that will be applied to the first subscriber host for the first service;
  extracting using a processor a second identifier from a second dynamic host configuration protocol (DHCP) or other network address lease communication associated with the first subscriber host for a second service;
  determining using a processor to determine that a second requirement will be applied to the subscriber host for the second service;
  extracting using a processor a third identifier from a third dynamic host configuration protocol (DHCP) or other network address lease communication associated with a second subscriber host for the first service; and
  determining using a processor that the first requirement will be applied to the second subscriber host for the first service;
  wherein the first identifier comprises a DSLAM physical port identifier and wherein determining that the first requirement will be applied to the first subscriber host includes performing a lookup to map the DSLAM physical port identifier to a corresponding subscriber identifier and using the corresponding subscriber identifier to determine that the first requirement is to be applied to the first subscriber host for the first service.

20. The computer program product as recited in claim 19, wherein extracting the first identifier includes parsing the DHCP or other network address lease communication.

21. The method of claim 19, wherein extracting the first identifier includes parsing DHCP option 82 information.

* * * * *